(12) United States Patent
Maeda et al.

(10) Patent No.: US 12,311,790 B2
(45) Date of Patent: May 27, 2025

(54) SYSTEMS AND METHODS FOR USER NEGOTIATION AT A MULTI-VEHICLE CHARGING STATION

(71) Applicant: Honda Motor Co., Ltd., Tokyo (JP)

(72) Inventors: Eri Izumi Maeda, Rancho Palos Verdes, CA (US); David Wong Cun, Fountain Valley, CA (US); Richard Pham, Lakewood, CA (US)

(73) Assignee: Honda Motor Co., Ltd., Tokyo (JP)

( * ) Notice: Subject to any disclaimer, the term of this patent is extended or adjusted under 35 U.S.C. 154(b) by 643 days.

(21) Appl. No.: 17/678,455

(22) Filed: Feb. 23, 2022

(65) Prior Publication Data

US 2023/0264582 A1 Aug. 24, 2023

(51) Int. Cl.
| | | |
|---|---|---|
| *B60L 53/00* | (2019.01) | |
| *B60L 53/30* | (2019.01) | |
| *B60L 53/31* | (2019.01) | |
| *B60L 53/66* | (2019.01) | |
| *B60L 53/68* | (2019.01) | |
| *H02J 7/00* | (2006.01) | |

(52) U.S. Cl.
CPC ............ *B60L 53/305* (2019.02); *B60L 53/31* (2019.02); *B60L 53/66* (2019.02); *B60L 53/68* (2019.02); *H02J 7/0049* (2020.01)

(58) Field of Classification Search
CPC ........ B60L 53/305; B60L 53/31; B60L 53/66; B60L 53/68; B60L 2250/16; B60L 2260/58; B60L 53/62; B60L 53/63; B60L 53/67; H02J 7/0049; H02J 7/0013; H02J 2310/48; Y02T 10/70; Y02T 10/7072; Y02T 90/12

USPC ........................................................ 320/109
See application file for complete search history.

(56) References Cited

U.S. PATENT DOCUMENTS

| | | |
|---|---|---|
| 9,744,870 B2 | 8/2017 | Cronie |
| 10,272,793 B2 | 4/2019 | Perry et al. |
| 10,293,699 B2 | 5/2019 | Zhao et al. |

(Continued)

FOREIGN PATENT DOCUMENTS

| | | |
|---|---|---|
| CN | 105182884 | 12/2015 |
| DE | 102011008674 | 7/2012 |

(Continued)

OTHER PUBLICATIONS

Office Action of U.S. Appl. No. 17/555,176 dated Nov. 12, 2024, 21 pages.

*Primary Examiner* — Paul Dinh
(74) *Attorney, Agent, or Firm* — Rankin, Hill & Clark LLP

(57) ABSTRACT

Systems and methods for a multi-vehicle charging station are provided. In one embodiment, a method includes identifying a charging station configured to provide a host vehicle a charge according a host vehicle charging schedule. The method also includes identifying a proximate vehicle based on a charging distance between the proximate vehicle from the charging station. The method further includes transmitting a cooperation request to the proximate vehicle. The method yet further includes receiving a proximate vehicle charging schedule from the proximate vehicle. The method includes generating a cooperative charging schedule based on a comparison of the host vehicle charging schedule and the proximate vehicle charging schedule. The method also includes transmitting the cooperative charging schedule to the charging station.

17 Claims, 8 Drawing Sheets

(56) References Cited

U.S. PATENT DOCUMENTS

| | | |
|---|---|---|
| 11,001,158 B2 | 5/2021 | Moghe et al. |
| 11,001,161 B2 | 5/2021 | Rosene et al. |
| 2010/0172491 A1 | 7/2010 | Broker et al. |
| 2010/0217485 A1 | 8/2010 | Ichishi |
| 2013/0162221 A1 | 6/2013 | Jefferies et al. |
| 2017/0315557 A1 | 11/2017 | Vogt et al. |
| 2018/0281612 A1 | 10/2018 | Perry |
| 2019/0152335 A1 | 5/2019 | Färber |
| 2020/0262307 A1 | 8/2020 | Rosene |
| 2021/0129703 A1 | 5/2021 | Annampedu |
| 2023/0038656 A1* | 2/2023 | Salter .................... B60L 53/305 |

FOREIGN PATENT DOCUMENTS

| | | |
|---|---|---|
| KR | 20210046399 | 4/2021 |
| KR | 20210066300 | 6/2021 |

\* cited by examiner

SYSTEMS AND METHODS FOR USER NEGOTIATION AT A MULTI-VEHICLE CHARGING STATION

BACKGROUND

Increasingly, vehicles are designed to be recharged using charging stations. For example, electric vehicles use an electric motor to provide all or part of the mechanical drive power of the vehicle. Some types of electric vehicle may be charged from an external source via a charging station. A plugin electric vehicle may include batteries which store power from the electric grid in an electrochemical cell. To facilitate charging of electric vehicles, charging stations are often positioned in parking structures and lots.

BRIEF DESCRIPTION

According to one aspect, a method for user negotiation at a multi-vehicle charging station is provided. The method includes transmitting a broadcast message with a cooperation proposal for a charging station configured to provide a host vehicle and a proximate vehicle a charge. The cooperation proposal includes a cooperative charging schedule having charging parameters for charging at least one of the host vehicle and the proximate vehicle. The method also includes determining whether the charging parameters of the cooperative charging schedule are amenable. In response to determining that the charging parameters are not amenable, the method includes generating a counter parameter. The method further includes updating the cooperative charging schedule with the counter parameter. The method yet further includes determining whether an updated cooperative charging schedule with the counter parameter is amenable. The method then includes transmitting the updated cooperative charging schedule to the charging station in response to determining the updated cooperative charging schedule is amenable.

According to another aspect, a system for user negotiation at a multi-vehicle charging station is provided. The system includes a processor and a memory storing instructions when executed by the processor cause the processor to identify the charging station configured to provide a host vehicle a charge according a host vehicle charging schedule. The instructions also cause the processor to determine whether the charging parameters of the cooperative charging schedule are amenable. The instructions also cause the processor to transmit a cooperation request to the proximate vehicle. The instructions further cause the processor to generate a counter parameter in response to determining that the charging parameters are not amenable. The instructions yet further cause the processor to update the cooperative charging schedule with the counter parameter. The instructions cause the processor to determine whether an updated cooperative charging schedule with the counter parameter is amenable. The instructions also cause the processor to transmit the updated cooperative charging schedule to the charging station in response to determining the updated cooperative charging schedule is amenable.

According to a further aspect, a non-transitory computer readable storage medium storing instructions that when executed by a computer, which includes a processor to perform a method for user negotiation at a multi-vehicle charging station. The method includes transmitting a broadcast message with a cooperation proposal for a charging station configured to provide a host vehicle and a proximate vehicle a charge. The cooperation proposal includes a cooperative charging schedule having charging parameters for charging at least one of the host vehicle and the proximate vehicle. The method also includes determining whether the charging parameters of the cooperative charging schedule are amenable. In response to determining that the charging parameters are not amenable, the method includes generating a counter parameter. The method further includes updating the cooperative charging schedule with the counter parameter. The method yet further includes determining whether an updated cooperative charging schedule with the counter parameter is amenable. The method then includes transmitting the updated cooperative charging schedule to the charging station in response to determining the updated cooperative charging schedule is amenable.

DETAILED DESCRIPTION

Figure 1:
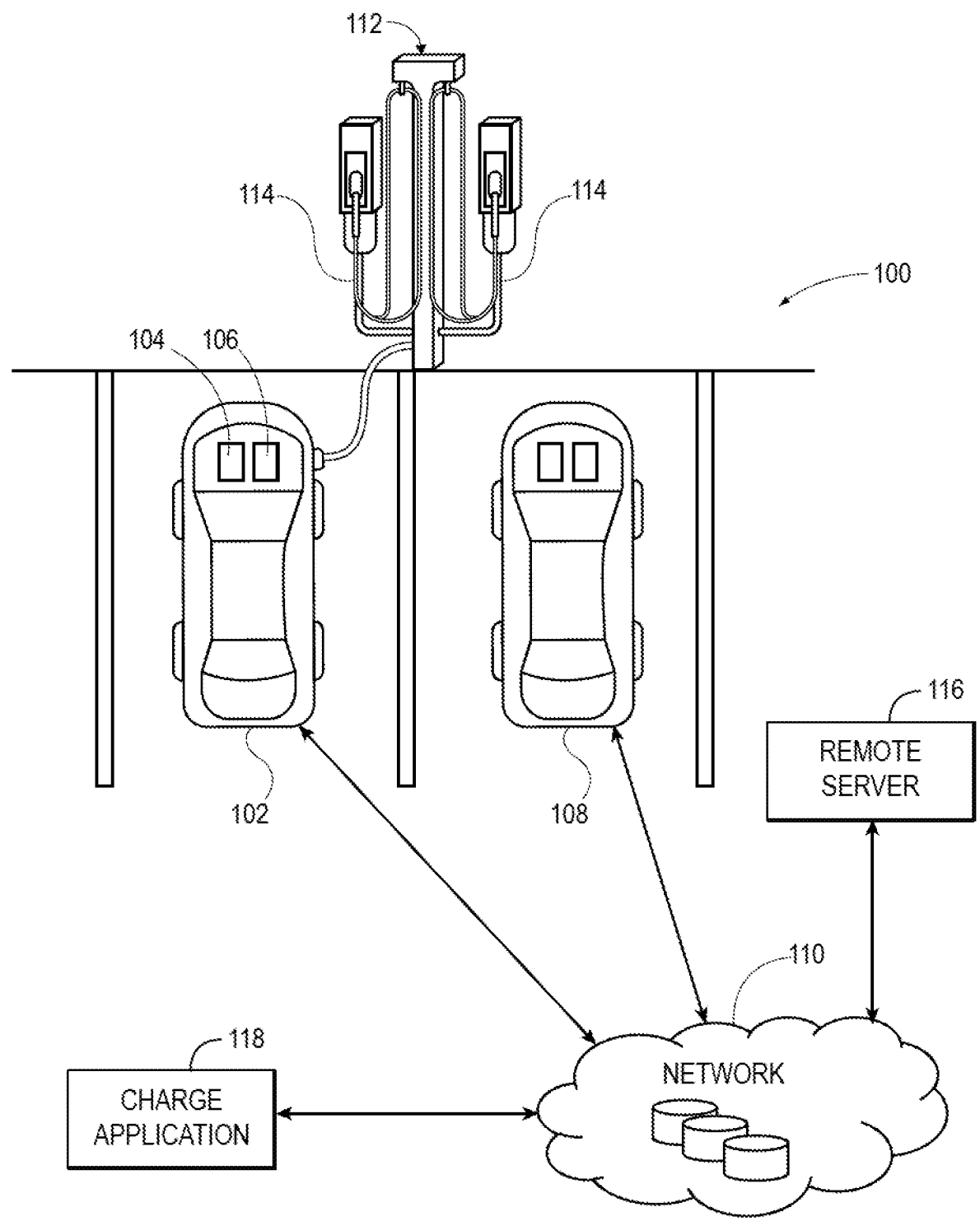
FIG. 1 is a schematic view of an exemplary operating environment having multiple vehicles utilizing a charging station according to one embodiment.

A charging station may be equipped to engage multiple vehicles at once. Typically, the charging station may supply power to the multiple vehicles from the same power source. Through this configuration, the vehicles may charge at different times or different speeds depending on how many other vehicles are charging at the same time. The systems and methods discussed herein are generally directed to managing the charging at a charging station for the multiple vehicles. One vehicle may be prioritized over another vehicle depending on their unique charging schedules. For example, one vehicle may be engaged with the charging station for a short period of time, while another vehicle may be at the station for a much longer period of time. The vehicle that will be engaged for a short period of time may be charged before the other vehicle as the other vehicle will have a longer opportunity to charge.

Furthermore, rather than relying on the charging station to prioritize vehicles, the vehicles may communicate with one another to prepare their own charging schedules. The vehicles may communicate information related to each other's schedules, their desired state of charge (SOC), charging level capabilities, trip information, and the like to determine a mutually beneficial charging schedule that may then be transmitted to the charging station. In this manner, the vehicles may use the existing communication infrastructure to cooperate, which both increases the ability of users to control the charging experience and reduces the drain on the processing power of the charging station that would otherwise merely be acting as an intermediary between the charging vehicles.

Definitions

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Charging station," as used here, refers to an access point to an energy source that a vehicle may engage to receive a charge. Accordingly, the charging station is an element in an energy infrastructure capable of transferring energy, for example, from the grid to a vehicle. The charging station may include a connector or connectors to connect to the vehicle or vehicles to the charging station. For example, the charge connector may include a range of heavy duty or special connectors that conform to the variety of standards, such as DC rapid charging, multi-standard chargers, and AC fast charging, etc.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein may include input and/or output devices for receiving input and/or devices for outputting data. The input and/or output may be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk, data store, and/or a memory.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, plasma display panels, touch screen displays, among others, that are often found in vehicles to display information about the vehicle. The display may receive input (e.g., touch input, keyboard input, input from various other input devices, etc.) from a user. The display may be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Station systems," as used herein may include, but is not limited to, any system that may be used to enhance the charge capability, use, and/or safety of a charging station. Exemplary station systems include, but are not limited to: a monitoring system, a vehicle identification system, a user detection system, communication system, a charge allocation system, a charge management system, a scheduling system, a sensory system, and a camera system among others.

"Value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle powered wholly or partially by any form of rechargeable energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more users and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle. The autonomous vehicle may carry one or more users. Further, the term "vehicle" may include vehicles that are automated or non-automated with pre-determined paths or free-moving vehicles.

I. Systems Overview

Referring now to the drawings, wherein the showings are for purposes of illustrating one or more exemplary embodiments and not for purposes of limiting the same, FIG. 1 is a high-level schematic view of a system 100 for managing a multi-vehicle charging station according to an exemplary embodiment of the present disclosure. The components of the system 100, as well as the components of other systems and architectures discussed herein, may be combined, omitted or organized into different architectures for various embodiments.

In the exemplary embodiment of FIG. 1, the system 100 includes a host vehicle 102 powered by an electric motor 104 and an electric storage mechanism, for example, a battery 106. In one embodiment, the host vehicle 102 is purely electric in that it only has the electric motor 104. In other embodiments, the host vehicle 102 may have the electric motor 104 and an internal combustion engine (not shown). In some embodiments, the host vehicle 102 may have any number of electric motors, batteries, and/or internal combustion engines and they may operate in series (e.g., as in an extended range electric vehicle), in parallel, or some combination of series and parallel operation.

Like the host vehicle 102, a proximate vehicle 108 may have any number of electric motors, batteries, and/or internal combustion engines and they may operate in series (e.g., as in an extended range electric vehicle), in parallel, or some combination of series and parallel operation. The proximate vehicle 108 may be charging and/or plan to charge at a charging station 112. The host vehicle 102 and the proximate vehicle 108 may operate in a similar manner or a different manner. The host vehicle 102 and the proximate vehicle 108 may transmit and receive data (e.g., state of charge (SOC) data, energy cost data, charging commands/signals) to and from other components of the system 100 through the network 110, including each other. For example, the host vehicle 102 and the proximate vehicle 108 may communicate with one another via the network 110.

The host vehicle 102 and the proximate vehicle 108 may also communicate a charging station 112 via the network 110 or a charging link 114. The host vehicle 102 and the proximate vehicle 108 may also communicate with a remote server 116, and vice versa, through the network 110. The remote server 116 may be a remote computing system or a device remote (e.g., off-board) from the host vehicle 102 or the proximate vehicle 108. While the embodiments described herein are described with respect to one host vehicle 102 and one proximate vehicle for clarity, the systems and methods described herein may function with multiple vehicles including a plurality of host vehicles and/or a plurality of proximate vehicles.

In the exemplary embodiment of FIG. 1, the system 100 may include a charging station 112 that may connect to the host vehicle 102 via a (respective) charging link 114 and to the proximate vehicle 108 also via a (respective) charging link 114. The charging station 112 may include charging equipment (not shown) that may replenish the battery 106 of the host vehicle 102 and a battery (not shown) of the proximate vehicle 108. Additionally, the charging station 112 may be operably connected for computer communication with the host vehicle 102, the proximate vehicle 108, and/or the remote server 116, for example, to transmit and receive data (e.g., charge parameters, charging data and feedback, vehicle system data). The charging link 114 may be a wired or wireless link to the charging station 112. Computer communication may occur also via the charging link 114 and/or a wired or wireless communication link.

The system 100 may include a charge application 118 that provides various types of enhancements (e.g., generate and provide users information regarding vehicle charging, facilitate making reservations, etc.) that may be applicable to the charging of a respective vehicle, such as the host vehicle 102 and/or the proximate vehicle 108. In an exemplary embodiment, the host vehicle 102, the proximate vehicle 108, the charging station 112, and/or the remote server 116 may receive and transmit data through the network 110 to the charge application 118. The charge application 118 may determine the relative charging needs of the host vehicle 102 and the proximate vehicle 108. For example, as will be discussed in greater detail below, the charge application 118 may compare charging schedules, current status, desired status, current location, etc. of the host vehicle 102 and the proximate vehicle 108. The charge application may also receive charging rates, charging infrastructure, charging queues, and/or additional charging related information that pertain to the charging station 112. The charge application 118 may include various modules and/or logic, as will be discussed in greater detail below with respect to FIG. 3 to provide enhancements to the electric vehicle charging systems from the perspective of the user of the host vehicle 102 and/or the proximate vehicle 108, as discussed below.

The charge application 118 may be configured to facilitate communications between the host vehicle 102 and the proximate vehicle 108, as well as the charging station 112. The charge application 118 may provide one or more interfaces to the user of the host vehicle 102 and/or the proximate vehicle 108 The charge application 118 may be hosted on the host vehicle 102, proximate vehicle 108 via a vehicle computing device, as will be discussed with respect to FIG. 2. Additionally, or alternatively, the charge application 118 may be hosted on the charging station 112 as will be discussed with respect to FIG. 3. In another embodiment, the charge application 118 may be hosted on the remote server 116 and accessed via the network 110, a will be discussed with respect to FIG. 4.

Figure 2:
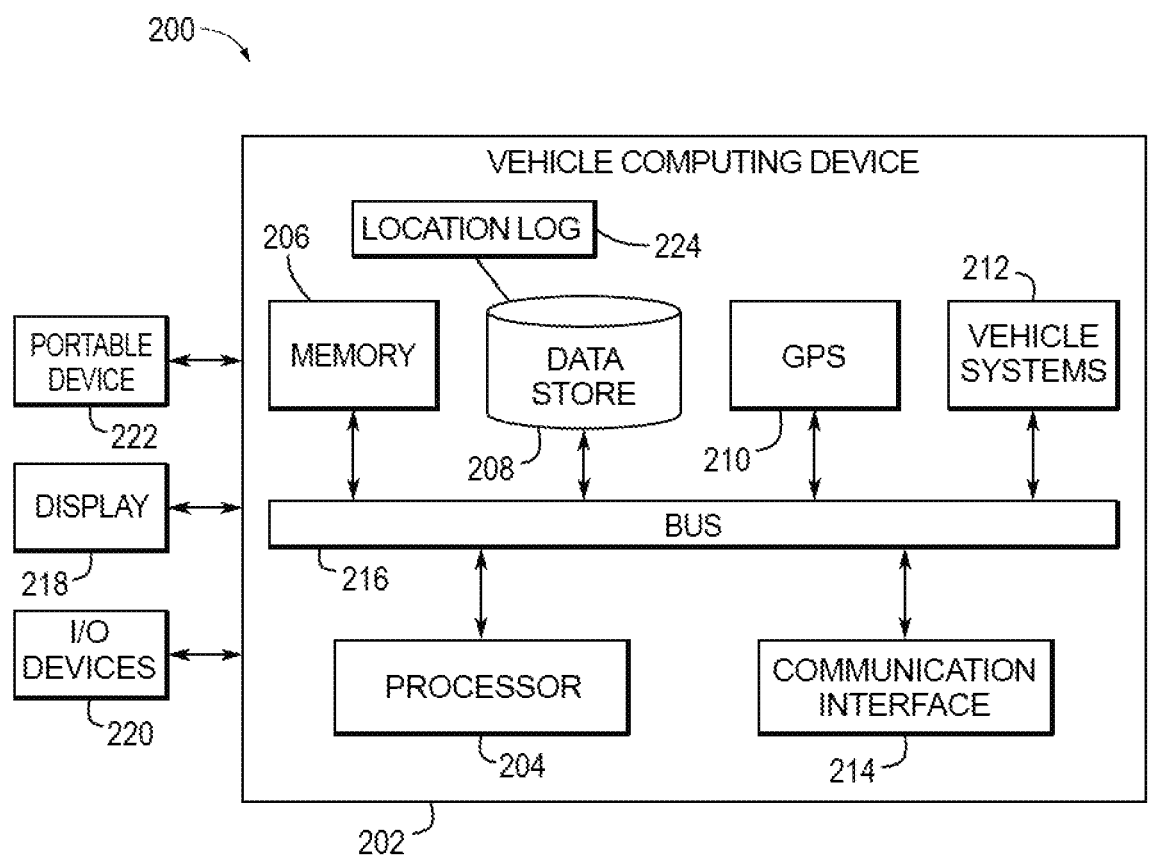
FIG. 2 is a block diagram of an operating environment for a charging station according to an exemplary embodiment.

Referring now to FIG. 2, a schematic view of an illustrative vehicle architecture 200, for example of the host vehicle 102 and/or the proximate vehicle 108 of FIG. 1, is provided. The host vehicle 102 and/or the proximate vehicle 108 may include a vehicle computing device (VCD) 202 (e.g., a telematics unit, an electronic control unit) with provisions for processing, communicating and interacting with various components of the host vehicle 102 and/or the proximate vehicle 108 and other components of the system 100.

The VCD 202 may include a processor 204, a memory 206, a data store 208, a position determination device 210 (GPS), a plurality of vehicle systems 212 (e.g., including the electric motor 104, the battery 106) and a communication interface 214. The components of the architecture 200, including the VCD 202, may be operably connected for computer communication via a bus 216 (e.g., a Controller Area Network (CAN) or a Local Interconnect Network (LIN) protocol bus) and/or other wired and wireless technologies. The VCD 202 as well as the host vehicle 102 and/or the proximate vehicle 108 may include other components and systems not shown.

Figure 8:
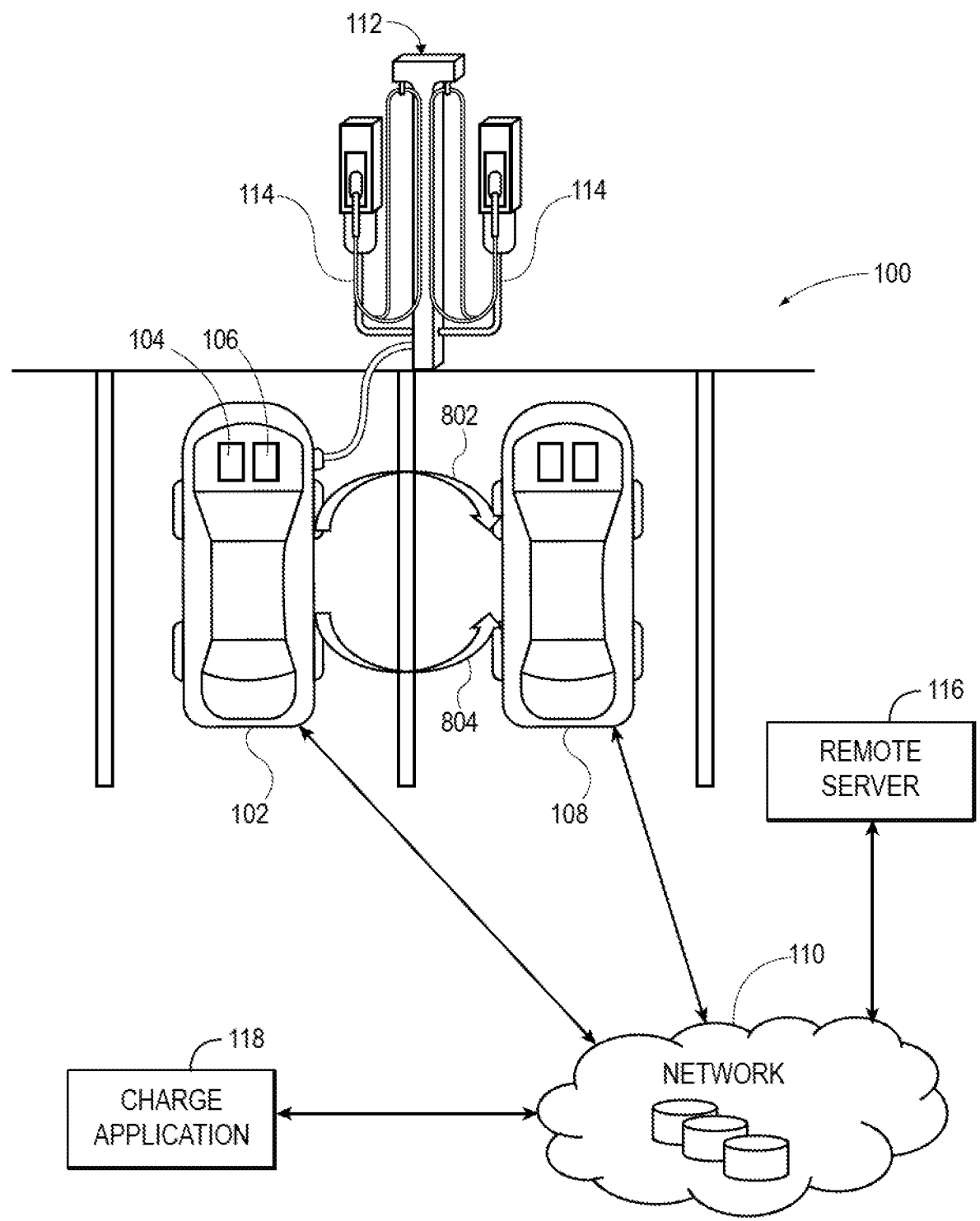
FIG. 8 is a schematic view of an exemplary operating environment having multiple vehicles negotiating according to one embodiment.

The data store 208 may store application data that may also include data pertaining to the charge application 118. In one embodiment, the data store may store charging schedules for the one or more vehicles. For example, the VCD 202 may be hosted on the host vehicle 102 and the data store 208 may store a host vehicle charging schedule 802, shown in FIG. 8. If the VCD 202 is hosted on the proximate vehicle 108, the data store 208 may store a proximate vehicle charging schedule 804, shown in FIG. 8. Furthermore, one or more vehicles may communicate charge schedules via computer communications and store the charging schedules on the data store 208.

In one embodiment, the data store 208 may include a location log 224 that may optionally (e.g., based on user approval) keep a log of locations at which the host vehicle 102 is driven, parked, and/or charged as historical data. For example, the VCD 202 may be hosted on the host vehicle 102. The location log 224 may include information such as when the host vehicle 102 has historically arrived at a location, departed the location, previously parked durations at the location, and previous charge periods that the host vehicle 102 has received a charge from various charging stations at the location. The location log 224 may be analyzed by the charge application 118 in comparison to point of interest data. Upon analyzing the location log 224, the charge application 118 may be configured to determine one or more travel routines from the historical data for a location or similar location having similar amenities, such as charging stations.

The communication interface 214 of the host vehicle 102 may provide software, firmware and/or hardware to facilitate data input and/or output between the components of the VCD 202 and other components, networks and data sources. Further, the communication interface 214 may facilitate communication with a display 218 (e.g., head unit display, head up display, dash board display) in the host vehicle 102 and other input/output devices 220, for example, a portable device 222 (e.g., key fob, smart phone) connected to the host vehicle 102.

In some embodiments the portable device 222 may include some or all of the components and functionality of the VCD 202. Additionally, the communication interface 214 may facilitate communication between the host vehicle 102 and the portable device 222 that may include a display and/or input/output devices (not shown) be used to operate various functions of the host vehicle 102. In one embodiment, the display 218 of the host vehicle 102 and/or the portable device 222 (e.g., through a display screen of the portable device 222) may be utilized to provide one or more user interfaces that may be included as a human machine interface(s) of the charge application 118.

The communication interface 214 may facilitate communication between the host vehicle 102 and the proximate vehicle 108. For example, a user of the host vehicle 102 may receive information about the proximate vehicle 108, such as the charging schedule, which may be displayed on the display 218 of the host vehicle 102 and/or the portable device 222. The communication interface 214 may facilitate the host vehicle 102 and the proximate vehicle 108 communicating via one or more vehicle communications protocols including the V2V communications protocol, the V2I communications protocol, and the V2X communications protocol. Additionally, the vehicle(s) may be partially capable of communicating via one or more vehicles communications protocols that include the V2I communications protocol and/or the V2X communications protocol. Furthermore, the user of the host vehicle 102 and/or the proximate vehicle 108 may confirm, change, and/or request information from other vehicles using the communication interface 214.

In one embodiment, the VCD 202 may be operably connected to one or more control units (not shown) of the vehicle(s) that may allow the VCD 202 to control the operation of the vehicle(s) in certain circumstances. For example, the VCD 202 may operably control one of more control units (not shown), that may include, but may not be limited to, an engine control unit, a transmission control unit, an acceleration control unit, a braking control unit, a steering control unit, and the like to autonomously control the operation of the vehicles(s) based on one or more commands that are provided by the VCD 202 through one or more vehicle systems 212 and/or executed applications. For example, the charge application 118 may communicate with the VCD 202 to provide one or more commands to the one or more control units to initiate or terminate charging of the vehicle(s).

As another example, the VCD 202 may communicate with a display 218, an I/O device 220, and or the portable device 222. The display 218 may include a head unit display screen, center stack display screen, meter display screen, heads up display screen. In addition to visual information the VCD 202 may communicate with the vehicle systems 212 to cause audio to be emitted through respective audio devices (not shown) (e.g., audio system, speakers), respective haptic devices (not shown) (e.g., haptic steering wheel), etc. that are used to provide a human machine interface (HMI) (not shown) to the driver(s) of the vehicle(s). The audio information may include warnings/alerts associated with the one or more applications, interfaces associated with one or more vehicle systems 212, and/or interfaces associated with one or more components of the vehicle(s).

In one or more configurations, data may be sent or received from the charge application 118 to the components of the host vehicle 102 and/or the proximate vehicle 108, the remote server 116, the charging station 112, the charging link 114, and/or the portable device 222. For example, commands from the charge application 118 may be sent to the charging station 112 and/or the charging link 114.

In an exemplary embodiment, the charge application 118 may include one or more user input interfaces and/or input means (e.g., buttons) that may be presented via the display 218, presented via the portable device 222, and or included within the host vehicle 102 and/or the proximate vehicle 108. In one embodiment, the one or more user input interfaces and/or input means may include user interface inputs that may be utilized by an individual (e.g., the user of the host vehicle 102 and/or the proximate vehicle 108) to enable or disable the presentation of one or more user interface graphics that may be presented by the charge application 118. Additionally, the one or more user input interfaces and/or input means may include user interface inputs that may be utilized by a user to input charging preferences, charging schedules, and/or make charging reservations.

As discussed above, the charge application 118 may be configured to provide one or more user interfaces to the user of the host vehicle 102 and/or the proximate vehicle 108 (and users of additional charging vehicles) that may allow the user to visually compare charging queues, and/or additional charging related information that may pertain to various charging stations 112 and/or be dynamically determined based on one or more factors associated with the host vehicle 102 and/or the proximate vehicle 108. In some embodiments, vehicle(s) of the multiple vehicles may be configured to communicate directly with the charging station 112, the remote server 116, and/or a charging entity that manages the charging station 112. For example, the vehicle(s) may use the V2I communications protocol to send and receive data.

Figure 3:
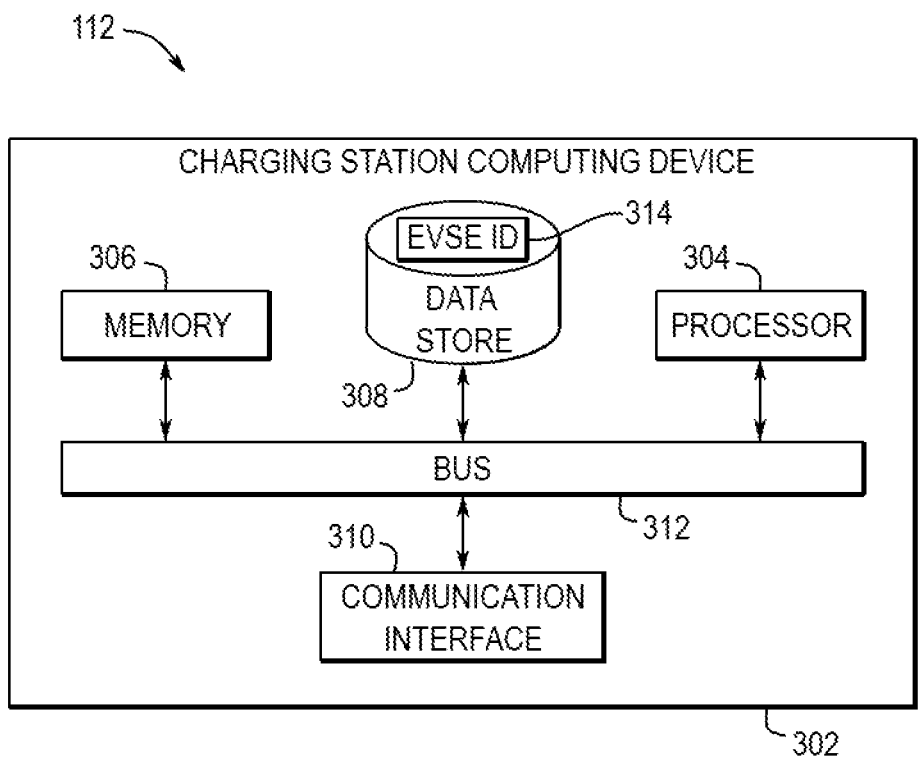
FIG. 3 is a schematic view of a computing device of charging station according to an exemplary embodiment.

Referring now to FIG. 3, a schematic view of a computing device of the charging station 112 of FIG. 1, is shown according to an exemplary embodiment. The charging station 112 may be maintained by an Original Equipment Manufacturer (OEM) (e.g., of the host vehicle 102, the proximate vehicle 108, and/or the charging station 112), a third-party that maintains, leases, and/or manages the host vehicle 102, the proximate vehicle 108 and/or the charging station 112, a utility provider, a regulatory body, among others. In FIG. 3, the charging station 112 may include a charging station computing device 302 that may further include a processor 304, a memory 306, a data store 308 and a communication interface 310.

The components of charging station 112, including the computing device 302, may be operably connected for computer communication via a bus 312 and/or other wired and wireless technologies. The computing device 302 as well as the charging station 112 may include other components and systems not shown. The data store 308 of the charging station 112 may store application data that may also include data pertaining to the charge application 118. In an exemplary embodiment, the data store 308 of the charging station 112 may be pre-populated with charging station identification data. The identification data may include, but may not be limited to, a pre-stored electric vehicle supply equipment (EVSE) identification (ID) 314 of the charging station 112, a pre-populated manufacturer information (not shown) of the charging station 112, a pre-populated model name/number (not shown) of the charging station 112, and/or one or more pre-populated components codes (not shown) that may be associated with one or more components of the charging station 112 (e.g., a valve).

The communication interface 310 of the charging station 112 may provide software, firmware and/or hardware to facilitate data input and output between the components of the charging station 112 and other components, networks and data sources. The communication interface 310 may facilitate communication between the charging station 112 and the remote server 116 through the network 110. Additionally, the communication interface 310 may facilitate communication between the charging station 112 and the host vehicle 102 and/or the proximate vehicle 108 through the network 110 and/or the charging link 114. The charging link 114 may facilitate communications between the remote server 116 and the host vehicle 102 and/or the proximate vehicle 108 and/or between the charging station 112 and the host vehicle 102 and/or the proximate vehicle 108 based on the execution of the charge application 118.

The charging station 112 may replenish the battery 106 using a charging energy source type that indicates the type of energy the charging station 112 provides. Energy may include clean renewable energy and non-renewable energy. Clean renewable energy may include, solar energy, hydro energy, biomass energy, wind energy, among others. Non-renewable energy may include electricity from a grid source, and in the case of hybrid vehicles, fossil fuels.

In one or more configurations, the host vehicle 102 and/or the proximate vehicle 108 may be configured to be capable of being fast charged based on fast charging components (not shown) that may be operably connected to a battery such as the battery 106 and/or that may be included as part of the battery 106. Fast charging may enable the host vehicle 102 and/or the proximate vehicle 108 to be charged at a faster charging speed than a default charging speed (i.e., standard charging speed) when being charged by a fast charging electric charging equipment (not shown) that may be included at the charging station 112. In particular, fast charging may provide a higher charging voltage from a default/conventional charging voltage (e.g., increase from 240 volts to 480 volts) to quickly provide a charge to the host vehicle 102 and/or the proximate vehicle 108. Accordingly, during utilization of fast charging, the host vehicle 102 and/or the proximate vehicle 108 may be more quickly charged to a particular SOC level than during the utilization of a standard charging speed. The charging station 112 may thereby provide a particular charging rate structure that may pertain to the utilization of the standard charging speed. Additionally, the charging station 112 may provide a particular charging rate structure that may pertain to the utilization of the fast-electric vehicle charging speed. In this manner, the charging station 112 may have different default charging speeds such as the standard charging speed and a fast charging speed.

Figure 4:
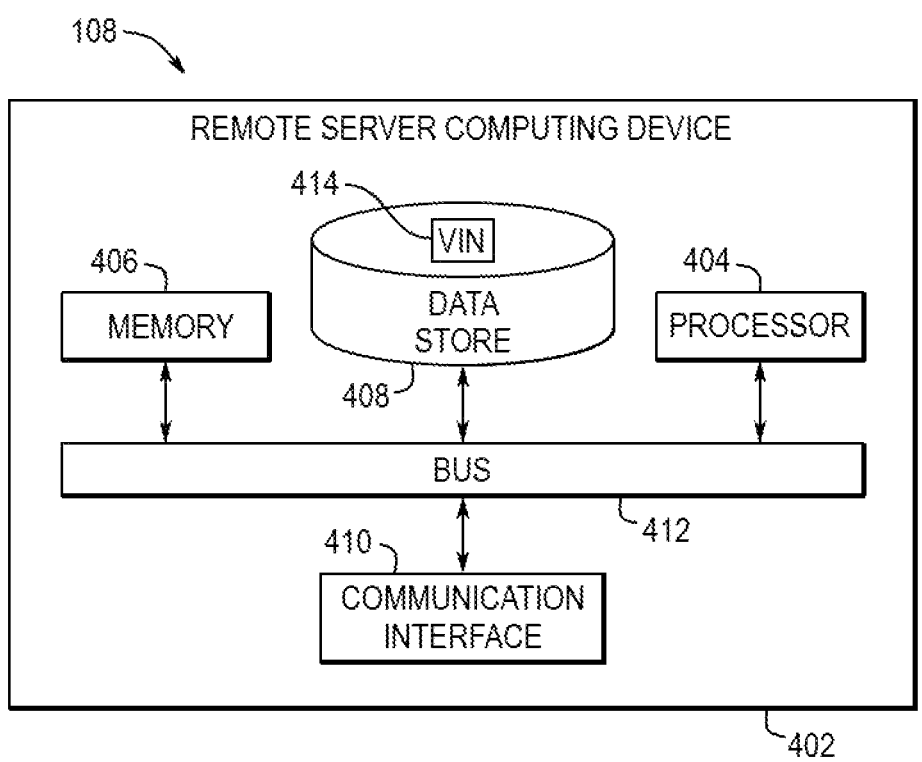
FIG. 4 is a schematic view of a remote server according to an exemplary embodiment.

Referring now to FIG. 4, a schematic view of the remote server 116 of FIG. 1, is shown according to an exemplary embodiment. The remote server 116, is located remotely (i.e., off-board) from the host vehicle 102, the proximate vehicle 108 and/or the charging station 112 and, in some embodiments may be maintained by an Original Equipment Manufacturer (OEM), for example, of the host vehicle 102, a manufacturer of the charging station 112, a third-party that maintains, leases, and/or manages the host vehicle 102 and/or the proximate vehicle 108 and/or the charging station 112, a utility provider, a regulatory body, among others. Additionally, in some embodiments, the remote server 116 may be another type of remote device or supported by a cloud architecture.

In FIG. 4, the remote server 116 may include a remote server computing device 402 that may further include a processor 404, a memory 406, a data store 408, and a communication interface 410. The components of the remote server 116, including the remote server computing device 402, may be operably connected for computer communication via a bus 412 and/or other wired and wireless technologies. The remote server computing device 402 as well as the remote server 116 may include other components and systems not shown.

The data store 408 may store application data that may also include data pertaining to the charge application 118. In an exemplary embodiment, the data store 408 may be configured to store identification data associated with the host vehicle 102 and/or the proximate vehicle 108 that may be manufactured, owned, operated, leased, maintained, and/or associated with one or more particular stakeholders (e.g., OEM). In particular, the data store 408 may be configured to store the vehicle identification number (VIN) 414 of the host vehicle 102 and/or the proximate vehicle 108. As discussed below, the charge application 118 may be configured to access the data store 408 to retrieve the VIN 414 of the host vehicle 102 and/or the proximate vehicle 108.

In another embodiment, the data store 408 may be configured to store identification data associated with the charging station 112 that may be manufactured, owned, operated, leased, maintained, and/or associated with one or more particular stakeholders (e.g., EVSE manufacturer). In particular, the data store 408 may be configured to store an EVSE ID 314 of the charging station 112. As discussed below, the charge application 118 may be configured to access the data store 308 to retrieve the EVSE ID 314 of the charging station 112.

The communication interface 410 of the remote server computing device 402 may be configured to provide software, firmware and/or hardware to facilitate data input and output between the components of the remote server computing device 402 and other components, networks and data sources. The communication interface 410 may be used to communicate with the host vehicle 102 and/or the proximate vehicle 108, the charging station 112, and/or other components of system 100. Therefore, the communication interface 410 may facilitate peer to peer communication between the vehicles even when the vehicles are remotely located. Accordingly, the host vehicle 102 and the proximate vehicle 108 may communicate regardless of location. In some embodiments, the host vehicle 102 and the proximate vehicle 108 may begin sending and receiving information from the charge application 118 based on future charging sessions at the charging station 112 before the host vehicle 102 and/or the proximate vehicle 108 arrive at the charging station 112.

The charge application 118 and its components will now be discussed in more detail according to an exemplary embodiment and with continued reference to FIG. 1 and FIG. 2. In one or more embodiments, the charge application 118 may be executed by the VCD 202 of the host vehicle 102 and/or the proximate vehicle. In an alternate embodiment, the charge application 118 may be executed by a processor (not shown) of the portable device 222 that may be used by a user of the host vehicle 102 and/or the proximate vehicle 108.

Figure 5:
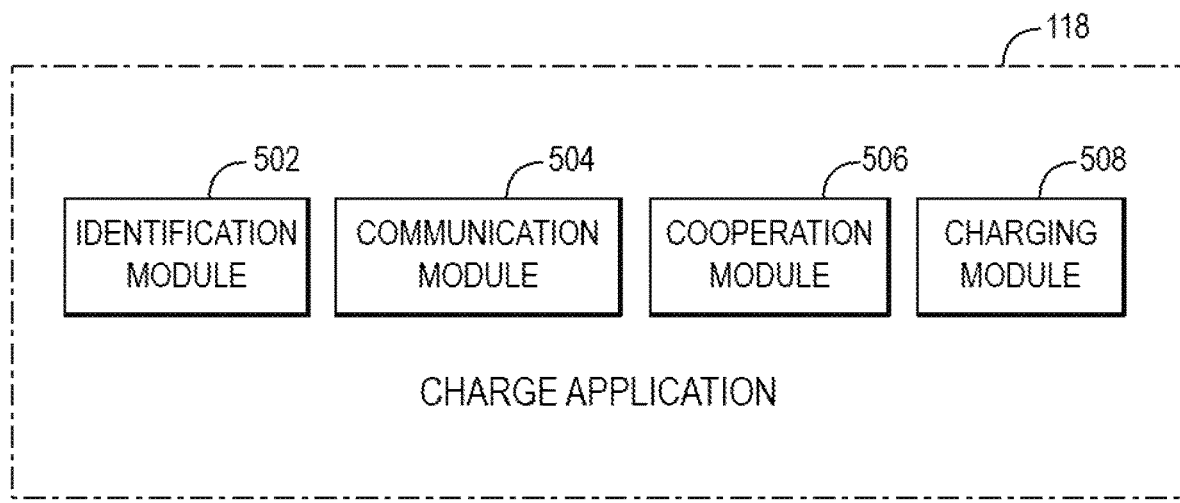
FIG. 5 is a block diagram of a cooperative application to facilitate use of a charging station according to an exemplary embodiment.

FIG. 5 is a schematic view of a plurality of modules 502-508 of the charge application 118 that may execute computer-implemented instructions for charging the host vehicle 102 and/or the proximate vehicle 108 based on one or more charging schedules including the host vehicle charging schedule 802, the proximate vehicle charging schedule 804, and the cooperative charging schedule, among others. In an exemplary embodiment, the plurality of modules 502-508 may include an identification module 502, a communication module 504, a cooperation module 506, and a charging module 508. The charge application 118 may additionally or alternatively include one or more additional modules and/or sub-modules that are included in lieu of the modules 502-508.

The modules 502-508 may be configured to communicate with the processor 204 of the VCD 202 of the host vehicle 102 and/or the proximate vehicle 108 to control the host vehicle 102 and/or the proximate vehicle 108. For example, the modules 502-508 may be configured to communicate with the processor 204 to provide charging power to the host vehicle 102 and/or the proximate vehicle 108 through the charging link 114. In another embodiment, the modules 502-508 may be configured to communicate with the host vehicle 102 and/or the proximate vehicle 108 through the communication interface 214. Similarly, the modules 502-508 may be configured to communicate with the processor 304 of the charging station computing device 302 of the charging station 112 or the processor 404 of the remote server computing device 402 of the remote server 116. Thus, the modules 502-508 may be configured to communicate with one another using the corresponding processor.

In some embodiments, the modules 502-508 may be distributed over multiple components. For example, the identification module 502 and the charging module 508 may be hosted by the charging station computing device 302 while the communication module 504 and the cooperation module 506 are hosted by the VCD 202. Accordingly, the modules 502-508 may communicate using a respective communication interface, such as the communication interface 214, the communication interface 310, and/or the communication interface 410 as well as the communication protocols described above.

II. Methods for a Multi-Vehicle Charging Station

Figure 6:
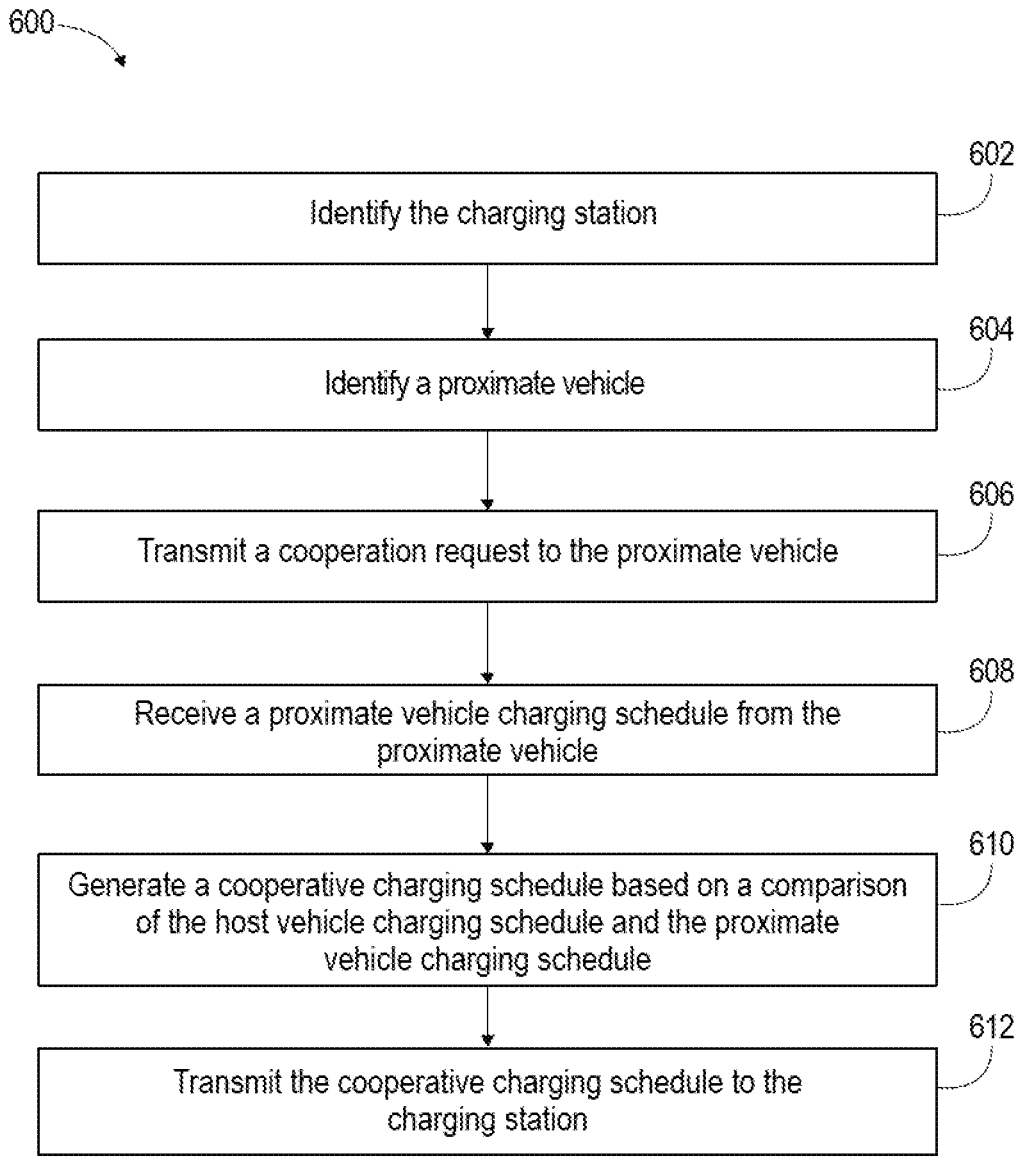
FIG. 6 is a process flow for utilizing a multi-vehicle charging station according to one embodiment.

Referring now to FIG. 6, a method 600 for a multi-vehicle charging station 112 according to an exemplary embodiment is provided. FIG. 6 will be described with reference to FIGS. 1-5. As shown in FIG. 6, the method 600 may be described by a number of blocks. For simplicity, the method 600 will be described by the steps associated with the blocks illustrated in FIG. 6, but it is understood that the steps of the method 600 may be organized into different architectures, blocks, stages, and/or processes.

At block 602, the method 600 includes the identification module 502 performing an identification process to identify a charging station 112. The identification module 502 may perform identification iteratively, according to a schedule, or be triggered. The identification module 502 may identify a component of the system 100 based on proximity. The identification module 502 may identify the charging station 112. The identification module 502 may identify the charging station based on the host vehicle 102 being in a communications range with the charging station 112. In another embodiment, the identification module 502 may identify the charging station 112 based on sensor data from one or more vehicle sensors associated with the vehicle systems 212. For example, the communication interface 214 may identify the charging link 114.

In another embodiment, the identification module 502 may request or retrieve the EVSE ID from the data store 308 of the charging station computing device 302. For example, if the charge application 118 is hosted on the VCD 202, the identification module 502 may request the EVSE ID 314 from one or more charging stations, such as the charging station 112, within a predetermined distance of the host vehicle 102.

The vehicle systems 212 may further include an imaging system that may identify the charging station 112 based on image data received from an image sensor, such as a camera. The identification module 502 may identify the charging station 112 based on the host vehicle charging schedule 802. For example, the host vehicle 102 may have a reservation to arrive at the charging station 112 at a host vehicle arrival time or start charging at a host vehicle charging start time according to the host vehicle charging schedule 802. As one example, in a first iteration, the identification module 502 may identify the charging station 112 configured to provide the host vehicle 102 a charge according to a host vehicle charging schedule 802.

The host vehicle charging schedule 802 may additionally include host vehicle historical data of the host vehicle 102 that includes one or more charging stations 112 that have provided a charge to the host vehicle 102. The host vehicle charging schedule 802 may further include charging parameters, such as a preferred charging speed of the host vehicle 102, the desired SOC of the host vehicle 102, etc.

Similarly, the proximate vehicle charging schedule 804 may identify the charging station 112 based on a charging reservation as well as proximate vehicle historical data of the proximate vehicle 108 that includes one or more charging stations 112 that have provided a charge to the proximate vehicle 108. The proximate vehicle charging schedule 804 may further include charging parameters, such as a preferred charging speed of the proximate vehicle 108, the desired SOC of the proximate vehicle 108, etc.

At block 604, the identification module 502 may identify the proximate vehicle 108. The identification module 502 may request or retrieve the VIN 414 from the data store 408 of the remote server computing device 402. For example, if the charge application 118 is hosted on the VCD 202, the identification module 502 may request proximate vehicle data, such as the VIN 414 from one or more vehicles, such as the proximate vehicle 108, within a predetermined distance of the host vehicle 102. In another embodiment, the identification module 502 may utilize a communication interface, such as the communication interface 214 of the VCD to communicate with one or more vehicles using the protocols described above. In some embodiments, the identification module 502 may broadcast an identification request. If the identification module 502 is hosted by the host vehicle 102, vehicles within a predetermined distance may respond such that the identification module receives identification data (e.g., the VIN 414).

The identification module 502 may receive identification data from the charging station 112. In one embodiment, the charging station 112 may respond to an identification request with identification data about the vehicle(s). In another embodiment, when the host vehicle 102 engages with the charging station 112 via the charging link 114, the charging station 112 may transmit information about other vehicle(s) currently engaged with the charging station 112 or scheduled to engage with the charging station 112.

In one embodiment, the identification module 502 may perform the identification process iteratively. For example, the identification process may include a first iteration and a second iteration. The first iteration may begin at a first time and the second iteration may begin at a second time after the first time. Vehicles may be identified in the charging process in the same or different iterations. For example, the host vehicle 102 may be identified in a first iteration and the proximate vehicle 108 may be identified in the second iteration.

The identification process may be triggered. For example, the identification module 502 may prompt an iteration of the identification process when the identification module 502 detects a charging event. A charging event may include a charging request being received from one or more charging vehicles, a charging link being established between a charging vehicle and the charging station, and charging vehicle being within a charging distance of the charging station, among others. In some embodiments, when the charging station 112 is engaged in a charging session, the identification module 502 may periodically identify the charging station 112 and/or currently charging vehicles, such as the proximate vehicle 108.

The identification process may be conducted during a current charging session that may be time based or interaction based. For example, the current charging session may be defined as a charging duration by an amount of time that it takes the charging station 112 to charge the host vehicle 102 and/or the proximate vehicle 108. The charging duration may be bounded by an initiation time when the charging station 112 is engaged by the host vehicle 102 and/or the proximate vehicle 108 and a completion time when the host vehicle 102 and/or the proximate vehicle 108 is disengaged from the charging station 112. The identification module 502 receives the initiation time and the completion time as charging data from the host vehicle charging schedule 802 and/or the proximate vehicle charging schedule 804.

The identification module 502 may identify engagement and/or disengagement based on an operable connection, such as the charging link 114. In one embodiment, the charging link 114 may be associated with a proximity signal such that the proximity signal is transmitted when the host vehicle 102 is within a charging distance of the charging station 112. A charging session may correspond to the time that a continuous proximity signal is received by the charging station 112 and/or the identification module 502. Likewise, the identification module 502 may receive a proximity signal from the proximate vehicle 108 is within the charging distance of the host vehicle 102 and/or the charging station 112.

The identification module 502 may identify the host vehicle 102 and/or proximate vehicle 108 based on direct communications via the communication module 504. For example, the communication interface 214 may send and receive messages from the host vehicle 102 and/or proximate vehicle 108 that allow the identification module 502 to identify the host vehicle 102 and/or proximate vehicle 108. In one embodiment, the communication interface 214, the host vehicle 102 and/or proximate vehicle 108 may include transceivers that enable communication.

The identification module 502 may additionally receive charging data from the charging station 112. For example, the communication interface 310 may include a transceiver, and thus, the charging station 112 may facilitate communication with the charge application 118. For example, the communication interface 310 of the charging station 112 may send and receive messages from the host vehicle 102 and/or proximate vehicle 108 that allow the identification module 502 to identify the host vehicle 102 and/or proximate vehicle 108 or send identifying information about the charging station 112 itself. For example, the charging station computing device 302 may receive charging data from engaged vehicle(s) and transmit that charging data to the identification module 502 via the communication interface 310.

The identification module 502 may identify a media access control (MAC) address associated with the host vehicle 102 and/or proximate vehicle 108 such that a first MAC address is identified for the host vehicle 102 and a second MAC address is identified for the proximate vehicle 108. For example, the MAC addresses may be identified by identification module 502 via the communication interface 214.

The identification module 502 may receive image data from the vehicle systems 212. For example, an optical sensor associated with the host vehicle 102 and/or the proximate vehicle 108 may include one or more cameras that capture image data regarding the parking area including the host vehicle 102, the proximate vehicle 108 and/or the charging station 112.

The identification module 502 may access or receive image data from nearby infrastructure such as roadway cameras, security cameras, speed cameras, red light cameras and traffic monitoring cameras among others from, for example, the remote server 116. The image data may also be used to analyze the parking area.

For example, the identification module 502 may analyze the image data to identify the parking spaces or other charging vehicles. The parking area may include a first parking space and a second parking space. The identification module 502 may use the image data to determine that the host vehicle 102 is in the first parking space and monitor the second parking space to identify the proximate vehicle 108. Accordingly, the proximate vehicle 108 may be identified based on its location in the parking area relative to the host vehicle 102.

The charging data may be stored with regard to specific vehicles in a charging schedule that identify or may be used to identify the corresponding vehicle. For example, the host vehicle 102 may be associated with the host vehicle charging schedule 802 and the proximate vehicle 108 may be associated with a proximate vehicle charging schedule 804. The charging schedules include charging data, including at least one charging parameter, specific to the corresponding vehicle. Generally, the charging data may include specific charging parameters associated with the vehicle to receive a charge, such as the current state of charge (SOC) of the corresponding vehicle, a desired SOC of the corresponding vehicle, a rate of consumption, historical charging data, a cost to charge the corresponding vehicle, total consumption by the corresponding vehicle, scheduling of the corresponding vehicle, charging credentials, average time to charge the corresponding vehicle based on a level of charge, the draw of the corresponding vehicle on the charging station 112, and patterns of voltage variation in the draw down process, among others.

The charging parameters, such as the above may be received from the vehicle systems 212 of the corresponding vehicle. The charging schedules may be stored in the memory 206, the data store 208, or the remote server 116. Charging schedules may also be stored on the memory 306 or the data store 308 of the charging station computing device 302. Charging schedules may be stored on the memory 406 or the data store 408 of the remote server computing device 402. Furthermore, new charging data may be generated based on the charging data in the charging schedules.

At block 606, the method 600 includes the communication module 504 transmitting a cooperation request to the proximate vehicle 108. In some embodiments, the cooperation request may establish direct communications between the host vehicle 102 and the proximate vehicle 108. The cooperation request may include the host vehicle charging schedule 802 from the host vehicle 102. Additionally, or alternatively, the cooperation request may request that the proximate vehicle 108 send the host vehicle 102 the proximate vehicle charging schedule 804. Accordingly, in response to transmitting the cooperation request, the communication module 504 may receive proximate vehicle charging schedule 804 from the proximate vehicle 108 at block 608 of the method 600. Therefore, the host vehicle 102 receives the proximate vehicle charging schedule 804 and the proximate vehicle 108 may receive the host vehicle charging schedule 802.

The cooperation request may form a basis for sharing utilization of the charging station 112. For example, the cooperation request may change charging preferences for the host vehicle 102 and/or the proximate vehicle 108. In some embodiments, the cooperation request may include a pecuniary arrangement between the host vehicle 102 and/or the proximate vehicle 108 to change an order of charging for the host vehicle 102 and/or the proximate vehicle 108. Thus, the host vehicle 102 and/or the proximate vehicle 108 may use the cooperation request to determine whether there is a minimum threshold advantage to the host vehicle 102 and/or the proximate vehicle 108 before having to engage in the cooperative charging by generating a cooperative charging schedule. In some embodiments, the host vehicle 102, receiving the proximate vehicle charging schedule 804, is determined by the cooperation module 506 to accept the cooperation request.

At block 610, the method 600 includes the cooperation module 506 generating a cooperative charging schedule based on a comparison of the host vehicle charging schedule 802 and the proximate vehicle charging schedule 804. The cooperative charging schedule defines the preferred relationship between charging vehicles, including the host vehicle 102 and/or the proximate vehicle 108, the charging style for the charging vehicles, desired charging parameters, and charge timing. The cooperative charging schedule may include one or more proposed charging parameters that may be sent in the form of specific values, ranges of values, plain text, messages, and signals, among others.

In some embodiments, the cooperative charging schedule may include commands for a charging schedule that cause the charging station to adjust an existing charging schedule. For example, if the charging station 112 is operating based on the host vehicle charging schedule 802 from the host vehicle 102, then the cooperative charging schedule may replace the host vehicle charging schedule 802 such that the charging station 112 stops operating according to the host vehicle charging schedule 802 and starts operating according to the cooperative charging schedule. In another embodiment, the cooperative charging schedule may cause one or more of the charging parameters of an existing charging schedule to be altered according to the proposed charging parameters of the cooperative charging schedule.

In one embodiment, the cooperation module 506 may determine an order of charging the host vehicle 102 and the proximate vehicle 108 based on the comparison of departure times. A host vehicle departure time is the time the host vehicle 102 is estimated to leave the charging station 112. For example, the host vehicle charging schedule 802 may include a host vehicle departure time that is based on a time that the host vehicle 102 is scheduled to disengage or depart from the charging station 112. In another embodiment the host vehicle departure time may be estimated by the cooperation module 506 based on historical data or a routine of the host vehicle 102 based on location data from the location log 224.

The proximate vehicle charging schedule 804 may include a proximate vehicle departure time at which the proximate vehicle 108 is scheduled to disengage or depart from the charging station 112. Likewise, the proximate vehicle departure time may be estimated by the cooperation module 506 based on historical data or a routine of the proximate vehicle 108. The cooperation module 506 may calculate a departure difference between the host vehicle departure time and a proximate vehicle departure time to determine first departing vehicle and a second departing vehicle based on an order of departure. For example, the first departing vehicle in the order of charging may be the vehicle with a departure time earlier than the other. Accordingly, the remaining vehicle would be the second departing vehicle. If the host vehicle departure time is 10:30 AM and the and the proximate vehicle departure time is 10:00 AM, then the proximate vehicle 108 is the first departing vehicle and the host vehicle 102 is the second departing vehicle in the order of charging.

At block 612 the method 600 includes the charging module 508 transmitting the cooperative charging schedule to the charging station 112. Transmitting the cooperative charging schedule may cause the charging station 112 to modify the current charging session based on one or more charging parameters. Continuing the example from above, if the proximate vehicle 108 is identified as the first departing vehicle and the host vehicle 102 is identified as the second departing vehicle based on the order of departure, then the cooperative charging schedule may include cooperative charging parameters that cause the proximate vehicle 108 to be charged before the host vehicle 102. The charging station 112 may update existing charging parameters based on the cooperative charging parameters of the cooperative charging schedule. For example, the charging station 112 may be operating be operating based on existing charging parameters from the host vehicle schedule if the host vehicle 102 arrived before the proximate vehicle 108. In response to receiving the cooperative charging schedule, the charging station 112 may update the existing charging parameters to the cooperative charging parameters. The charging module 508 may receive confirmation that the charging station has updated the existing charging parameters to the cooperative charging parameters.

The charging station 112 may calculate cooperative charging parameters based on the cooperative charging schedule. For example, based on the order of charging in the cooperative charging schedule, the charging station 112 may calculate a charging time, charging duration, charging speed, etc. that the charging station will operate at in order to comport with the cooperative charging schedule. In one embodiment, the charging module 508 associated with the host vehicle 102 may receive the cooperative charging parameters from the charging station 112 that causes the charging module 508 of the host vehicle 102 to terminate charging and/or the charging module 508 of the proximate vehicle 108 to commence charging such that the first departing vehicle is charged before the second departing vehicle.

In the example described above, the cooperative charging schedule is based on the relative departure times of the multiple vehicles at the charging station 112. However, any number of relative factors between the multiple vehicles may be used to generate the cooperative charging schedule. For example, the cooperation module 506 may determine the order of charging of the host vehicle 102 and the proximate vehicle 108 based on the comparison of desired SOC of the host vehicle 102 and the proximate vehicle 108. The host vehicle charging schedule 802 may include a host vehicle desired SOC. For example, the host vehicle charging schedule 802 may include that host vehicle 102 has a host vehicle current SOC of 40% of total charge and host vehicle desired SOC of 75%. The proximate vehicle charging schedule 804 may include that the proximate vehicle 108 has a proximate vehicle current SOC of 80% and a proximate vehicle desired SOC of 100%.

Returning to block 610 of the method 600, the comparison of the host vehicle charging schedule 802 and the proximate vehicle charging schedule 804 may include comparing the current SOCs, the desired SOCs, or difference in the current SOCs and the desired SOCs of the host vehicle 102 and the proximate vehicle 108. For example, the cooperation module 506 may compare the host vehicle current SOC of 40% and the proximate vehicle current SOC of 80%. The order of charging may include a first vehicle and a second vehicle as described above. The first vehicle may be the vehicle with the lowest current SOC. Accordingly, the cooperative charging schedule may indicate that the host vehicle 102 is the first vehicle and the proximate vehicle 108 is the second vehicle in the order of charging.

As another example, the relative factor may be a charge period, and the cooperation module 506 may determine the charge period for each of the charging vehicles. The charging period is the length of time that a charging vehicle is estimated to receive a charge from the charging station 112. For example, the host vehicle 102 may be capable of being fast charged based on fast charging components, while the proximate vehicle 108 is only capable of standard charging speeds which are lower than the fast charging speeds. The comparison includes the cooperation module 506 calculating a host vehicle charge period and a proximate vehicle charge period. The host vehicle charge period may be based on the host vehicle desired SOC and/or host vehicle charge speed included in the host vehicle charging schedule 802. The proximate vehicle charge period may be based on the proximate vehicle desired SOC and/or the proximate vehicle charge speed included in the proximate vehicle charging schedule 804.

The cooperation module 506 may generate the cooperative charging schedule based on the comparison. For example, the host vehicle 102 may have a shorter charging period than the proximate vehicle 108 even though the host vehicle 102 is set to increase the host vehicle SOC by 35% and the proximate vehicle 108 is set to increase the proximate vehicle SOC by 20%. Thus, the cooperative charging schedule may identify the host vehicle 102 as the first vehicle in the order of charging because the charge period of the host vehicle 102 is shorter. Accordingly, the cooperation module 506 may calculate a relative benefit between the host vehicle 102 and the proximate vehicle 108 based on the comparison. I In another embodiment, the cooperation module 506 may determine whether the host vehicle 102 is capable of reaching the host vehicle desired SOC and/or the proximate vehicle 108 is capable of reaching the proximate vehicle desired SOC. If a charging vehicle is unable to reach the desires SOC, then that vehicle may be identified as the second charging vehicle so that a charging vehicle capable of reaching the desired SOC may charge first. If the proximate vehicle 108 is capable of reaching the proximate vehicle desired SOC but the host vehicle 102 is not capable of reaching the host vehicle desired SOC, then the cooperative charging schedule may identify the proximate vehicle 108 as the first vehicle in the order of charging because proximate vehicle 108 may reach the host vehicle desired SOC. Therefore, the cooperation module may select which vehicle charges first based on a comparison of relative factors between the host vehicle 102 and the proximate vehicle 108.

In another embodiment, the cooperation module 506 may generate a cooperative charging schedule that identifies charging speeds for the vehicles engaged with the charging station 112. For example, the proximate vehicle 108 may only be capable of reaching the proximate vehicle desired SOC if the proximate vehicle 108 engages in fast charging. However, if the proximate vehicle 108 engages in fast charging, one or more other vehicles may not be able to charge at a desired speed. For example, the host vehicle charging schedule 802 may identify a desired charging speed as a charging parameter. Based on the parked duration of the host vehicle 102, the cooperation module 506 may determine that the host vehicle is capable of reaching the host vehicle desired SOC at a lower charging speed that then desired charging speed. Therefore, the cooperative charging schedule may include the proximate vehicle 108 fast charging at the charging station and the host vehicle 102 having a charging speed lower than the desired charging speed, as both vehicles will be able to reach their respective desired charging parameters. Accordingly, multiple factors (e.g., desired charging speed, desired SOC, charging duration, departure time, etc.) may be compared to generate the cooperative charging schedule.

As discussed above, the cooperation module 506 may calculate a relative benefit between the host vehicle 102 and the proximate vehicle 108 based on the comparison. For example, the cooperative charging schedule may be generated based on the relative factors so that each vehicle is capable of reaching a highest percentage of charging parameters from their respective charging schedules. The cooperative charging schedule may select a charging order and/or charging speeds for the host vehicle 102 and the proximate vehicle 108 that allow the host vehicle 102 and the proximate vehicle 108 to reach a percentage of their respective desired SOC. For example, the desired host vehicle SOC may be 85% and the proximate vehicle desired SOC may be 100%. The cooperation module 506 may compare the desired charging schedules and determine that only one vehicle is capable of reaching the desired SOC. Thus, the cooperation module 506 may generate a cooperative charging schedule in which each of the vehicles reaches a percentage of the desired SOC, for example 80%, so that the host vehicle 102 reaches an SOC of 68% and the proximate vehicle reaches an SOC of 80% after charging. Accordingly, if one or more of the engaged vehicles is unable to reach a desired charging parameter, the cooperation module 506 may compare the factors to balance the desired charging parameters of the engaged vehicles.

As described herein, when multiple vehicles are charging at a charging station 112 according to respective charging schedules, the charge application 118 may facilitate cooperation between the vehicles. For example, if there are two charging vehicles, the host vehicle 102 and the proximate vehicle 108, a cooperative schedule may determine the order of charging or the charging speed for the host vehicle 102 and the proximate vehicle. The cooperative schedule reduces the computation requirements on the charging stations, provides for efficient charging, and mitigates the drain on the electrical grid, while improving the user charging experience. While two vehicles are described for clarity, the systems and methods described herein may be applied to more vehicles.

III. Methods for User Negotiation

Figure 7:
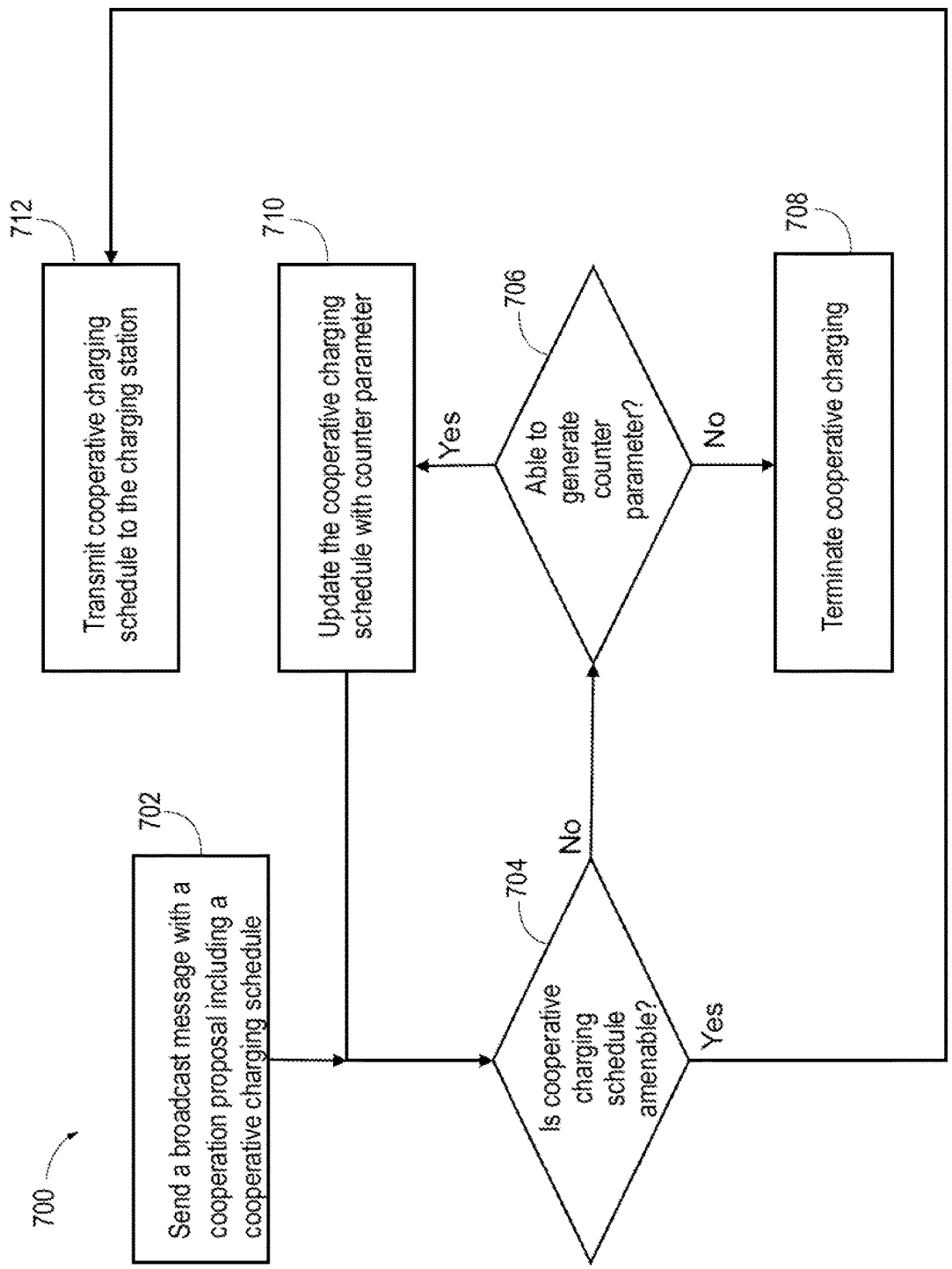
FIG. 7 is a process flow for utilizing a multi-vehicle charging station via negotiation according to one embodiment.

Referring now to FIG. 7, a method 700 for user negotiation associated with the multi-vehicle charging station 112 according to an exemplary embodiment is provided. FIG. 7 will be described with reference to FIGS. 1-6 and 8. As shown in FIG. 7, the method 700 may be described by a number of blocks. For simplicity, the method 700 will be described by the steps associated with the blocks illustrated in FIG. 7, but it is understood that the steps of the method 700 may be organized into different architectures, blocks, stages, and/or processes.

At block 702, the method 700 includes the identification module 502 transmitting a broadcast message including a charging cooperation proposal. The cooperating proposal may form a basis for cooperating vehicles, such as the host vehicle 102 and the proximate vehicle 108, to utilize the charging station 112. For example, the cooperative charging schedule may include proposed charging parameters for the host vehicle 102 and/or the proximate vehicle 108, such as the relative charging speed, amount of charge to be received, length of charge, etc. Thus, the cooperating vehicles may use the cooperating proposal to determine whether there is a minimum threshold advantage to the cooperating vehicles before engaging the charging station.

The cooperative charging schedule may be based on the host vehicle charging schedule 802 of the host vehicle 102. For example, the identification module 502 may broadcast the host vehicle charging schedule 802 as the cooperative charging schedule. Accordingly, the charging parameters may include at least one of a host vehicle departure time, a host vehicle desired SOC, or host vehicle historical data of the host vehicle 102. In another embodiment, the identification module 502 may identify one or more proximate vehicles, such as the proximate vehicle 108, that are within a predetermined distance of the host vehicle 102 and/or the charging station 112. The identification module 502 may then transmit the broadcast message to the identified one or more proximate vehicles.

At block 704, the communication module 504 determines whether the proposed charging parameters are amenable. In one embodiment, the determination is based on a response from a proximate vehicle 108. For example, the communication module 504 may receive a response from the proximate vehicle 108 or a vehicle occupant of the proximate vehicle 108 in response to the broadcast message. The response may indicate an interest in cooperative charging at the charging station. Additionally or alternatively, the response may indicate desired charging parameters of the proximate vehicle 102. For example, the response may include a proximate vehicle charging schedule 804. The proximate vehicle charging schedule 804 may be compared to the cooperative charging schedule. The communication module 504 may identify differences between the cooperative charging schedule and the proximate vehicle charging schedule 804. For example, the cooperative charging schedule may include the host vehicle 102 being charged at a fast charging speed whereas the proximate vehicle charging schedule 804 may indicate the host vehicle 102 being charged at a standard speed. As another example, the proximate vehicle charging schedule 804 may indicate the proximate vehicle 108 being charged at a fast speed. Accordingly, the charging speed may be identified as a difference.

In some embodiments, the communication module 504 may request maintenance data and/or performance data of the charging station 112 to determine if more than one vehicle may be charged by the charging station 112. The maintenance data may indicate the current status of the charging station. For example, the maintenance data may indicate if the charging station 112 has been serviced recently and/or if a component of the charging station 112 is faulty or detective. The performance data indicates the charging data for vehicles that have previously used the charging station 112. In one embodiment, the performance data may compare historical charging data to default parameters.

The maintenance data and/or the performance data may be stored in a data store 308 of the charging station computing device 302. For example, if both the cooperative charging schedule and a response from the proximate vehicle 108, such as the proximate vehicle charging schedule 804, indicate that the host vehicle 102 and the proximate vehicle 108 are to be charged at the fast charging speed. The communication module 504 may request the maintenance data and performance data from the charging station computing device 302. The maintenance data and performance data of the charging station 112 may indicate historical charging speeds the charging station 112 has provided in the past. For example, the communication module may estimate charging speed based on the performance data. Accordingly, the communication module 504 may estimate charging speeds for charging more than one vehicle by the charging station 112. In this manner, the communication module 504 may determine if the charging parameters of the both the cooperative charging schedule and a response from the proximate vehicle 108, such as the proximate vehicle charging schedule 804 may be satisfied by the charging station 112.

In some embodiments, the host vehicle 102 and the proximate vehicle 108 receive the other cooperating vehicle's charging schedule and determine if the proposed charging parameters defined by the other cooperating vehicle are agreeable. For example, the host vehicle 102 may receive a charging cooperation proposal from the proximate vehicle 108, such as the proximate vehicle charging schedule 804. The communication module 504 may compare the proposed charging parameters received from the proximate vehicle 108 to a listing of desired charging parameters of the host vehicle 102. Additionally or alternatively, the proposed charging parameters received from the proximate vehicle 108 may be compared to safety guidelines, vehicle capabilities, etc. before determining whether the proposed charging parameters are amenable to the host vehicle 102.

The cooperating vehicles, including the host vehicle 102 and the proximate vehicle 108, may exchange proposed charging parameters via peer to peer communication, the communication interface 214, the communication interface 310, and/or the communication interface 410 as well as the communication protocols described above. In one embodiment, the charging station computing device 302 may initiate negotiation between the cooperating vehicles before engaging additional vehicles at the charging station 112. Although described with respect to the host vehicle 102 and a proximate vehicle 108, additional proximate vehicles may receive the broadcast message and/or send responses to the communication module 504.

In another embodiment, a vehicle occupant may be prompted to confirm the charging parameters of the cooperative charging schedule are amenable with a negotiation alert. For example, the communication module 504 may generate the negotiation alert may be an audio cue, visual cue, hybrid cue, etc. generated through an audio system (not shown), a display 218, and/or a portable device 222. The vehicle occupant of the host vehicle 102 may be alerted that the proximate vehicle charging schedule 804 includes a fast charging speed as a desired charging speed in the proposed charging parameters. Likewise, the vehicle occupant of the proximate vehicle 108 may be alerted that the cooperative charging schedule and/or the host vehicle charging schedule 802 includes a fast charging speed as a desired charging speed in the proposed charging parameters. The negotiation alert may prompt the vehicle occupant to accept the desired speed of the proximate vehicle 108 and/or the host vehicle 102 as being amenable.

The negotiation alert may also provide the vehicle occupant an opportunity to provide a counter parameter. In this manner, the vehicle occupant may manually input the counter parameter, at block 706, such that the vehicle occupant is able to take an active role in the parameter negotiation.

In another embodiment, the negotiation alert may request information from the vehicle occupant. For example, the negotiation alert may request the user indicate whether the vehicle occupant of the host vehicle 102 is staying with the host vehicle 102 during the charging station. The counter parameters generated by the communication module 504 may be based on the location of the vehicle occupant. For example, if the vehicle occupant is staying with the vehicle, the counter parameters may be generated to reduce the length of time the host vehicle is charging. For example, the counter parameter may not reduce the charging speed, but instead, reduce the target SOC of the host vehicle 102.

If at block 704, the communication module 504 determines that the cooperative charging schedule is amenable, the method 700 continues to block 712. At block 712, the cooperative charging schedule is sent to the charging station 112, as will be discussed in greater detail below.

If at block 704, one or more of the cooperating vehicles do not find the proposed charging parameters amenable, then the method 700 continues to block 706. At block 706, a counter parameter is generated. In one example, a charging parameter is sent from the proximate vehicle 108 to the host vehicle 102 in a proximate vehicle charging schedule 804, and the charging parameter is a desired charging speed of the proximate vehicle 108, such as a fast charge. However, if the proximate vehicle 108 receives a fast charge will adversely affect the charging speed of the host vehicle 102, then the host vehicle 102 may not find the proposed charging parameters acceptable.

At block 706, the cooperation module 506 attempts to generate a counter parameter. A counter parameter is a charging parameter that proposes an adjustment to a proposed charging parameter from the cooperative charging schedule. The counter parameter may be selected from a range of alternative values provided with a charging parameter. For example, rather than sending a single desired charging speed for a charging session, the proximate vehicle 108 may include alternatives, such as a fast charging speed for a predetermined amount of time, or that the proximate vehicle 108 transition to fast charging after the host vehicle 102 has received a predetermined amount of charge. Accordingly, the cooperation module 506 may select that the proximate vehicle 108 transition to fast charging after the host vehicle 102 has received a predetermined amount of charge as the counter parameter. Thus, the proposed charging parameters and counter parameters may be discrete values, ranges, thresholds, etc.

Alternatively, the communication module 504 may generate a counter parameter, at block 706, based on the proposed charging parameter of the proximate vehicle 108. The counter parameter may be calculated based on the vehicle charging schedule, historical data in a similar scenario, and current charge status (e.g., current SOC, current charging speed, etc.). Continuing the example from above, the proximate vehicle 108 may send the proximate vehicle charging schedule 804 having the cooperation proposal with a fast charging speed as a desired charging speed in the proposed charging parameters. The host vehicle 102 may determine a first estimated charging speed of the host vehicle 102 if the proposed charging parameter is accepted. If the first estimated charging speed would cause the host vehicle 102 not to reach a desired charging parameter of the host vehicle charging schedule 802, such as a desired SOC, then the cooperation module 506 may calculate a second estimated charging speed of the host vehicle 102, based on a number of counter parameters, that would allow the host vehicle 102 to reach the desired charging parameter of the host vehicle charging schedule 802. For example, the cooperation module 506 may calculate the predetermined amount of time that the proximate vehicle 108 could charge at the fast charging speed that would allow the host vehicle 102 to reach the desired charging parameter. Alternatively, the host vehicle 102 may transmit a counter parameter that the proximate vehicle 108 reduce the charging speed of the proximate vehicle 108.

In another embodiment, the cooperation module 506 may determine a counter parameter or proposed charging parameter based on penalties associated with the charging station 112. For example, the charging station 112 may institute idle penalties for vehicles that are occupying the charging station 112 without receiving a charge. If the host vehicle 102 is estimated to reach a target SOC before a vehicle occupant returns to the host vehicle 102, and the proximate vehicle charging schedule 804 includes a cooperation proposal with a standard charging speed as a desired charging speed. The communication module 504 may determine that the proximate vehicle 108, charging at a fast charging speed, would lengthen the charging time of the host vehicle 102, thereby reducing or eliminating idle fees incurred by the host vehicle 102. Accordingly, the host vehicle may transmit a counter parameter that the proximate vehicle 108 increase the charging speed of the proximate vehicle 108.

The counter parameter may be used to tailor the cooperating proposal to the charging session based on past and current data from the charging station 112. For example, the communication module may calculate a counter parameter based on the maintenance data and performance data of the charging station 112. For example, the communication module 504 may determine that allow the charging station 112 indicates that charging amenities, such as fast charging, are available, the performance data of the charging station 112 may indicate that the charging station has not historically provided the charging amenities. Accordingly, the cooperation module 506 may generate a counter parameter that may indicate a slower charging speed based on the performance data.

In one embodiment, the cooperation module 506 may calculate a host vehicle charge period based on a host vehicle desired SOC based on the cooperative charging schedule. The cooperation module 506 may additionally calculate a proximate vehicle charge period based on the proximate vehicle desired SOC received as a response or the proximate vehicle charging schedule 804. The cooperation module 506 then determines whether the host vehicle 102 is able to reach the host vehicle desired SOC or the proximate vehicle 108 is able to reach the proximate vehicle desired SOC. The counter parameter is then generated based on the determination.

In some embodiments, a counter parameter may not be able to be generated at block 706. For example, a cooperating vehicle may not be able to calculate counter parameters based on other proposed charging parameters or safety guidelines. Alternatively, the counter parameter may not be generated due to another cooperating vehicle or vehicle operator indicating that it is unwilling to negotiate. If a counter parameter cannot be generated, the method 700 continues to block 708.

At block 708, the cooperative charging is terminated. In some embodiments, terminating cooperative charging will prevent more than one vehicle charging at the charging station. In another embodiment, cooperative charging being terminated may cause the charging station 112 to provide a charge to vehicles engaged with the charging station at a default charging station parameters. To prevent cooperating vehicles from entering into a loop of initiating and terminating cooperative charging, once cooperative charging is terminated, the cooperating vehicles may be temporarily barred from re-initiating cooperative charging for a predetermined amount of time and/or during a charging session.

If a counter parameter is generated at 706, the method 700 continues to block 710. At block 710, the counter parameter is added to the cooperative charging schedule such that the cooperative charging schedule is updated with the counter parameter. For example, if the cooperation module 506 generates a counter parameter, then the counter parameter is added to the cooperative charging schedule by the communication module 504 to generate the updated cooperative charging schedule. Accordingly, the communication module 504 may add the counter parameter to the host vehicle charging schedule 802 by updating an existing charging parameter with the counter parameter.

In response to the counter parameter being generated at block 706 and/or the charging schedule of a cooperating vehicle being updated at block 708, the method 700 returns to block 702, such that the counter parameter is sent to the other cooperating vehicles. For example, the counter parameter being generated may prompt the communication module 504 to resend the vehicle charging schedule. In this manner, the other cooperating vehicles may assess the counter parameter at block 704. Accordingly, the communication module determines whether an updated cooperative charging schedule with the counter parameter is amenable, in a similar manner as described above. If the counter parameter is not amenable, the negotiation cycle begins again, and at block 706 a new counter parameter may be generated and again the vehicle charging schedules are resent.

Once each of the cooperating vehicles in the cooperative grouping determine that the cooperating parameters are amenable at block 704, the method 700 continues to block 712. At block 712, the agreed upon charging parameters are sent to the charging station 112 in response to determining the updated cooperative charging schedule is amenable. For example, the updated cooperative charging schedule may be transmitted to the charging station 112. The charging station 112 may then initiate charging via the charging link(s) 114 according to the charging parameters of the cooperative charging schedule or the updated cooperative charging schedule. Therefore, rather than relying on the charging station 112 to determine the charging parameters for the cooperating vehicles, the cooperating vehicles may communicate with one another to prepare their own cooperative charging schedule.

For example, the host vehicle 102 and the proximate vehicle 108 may communicate information related to each other's schedules, their desired state of charge (SOC), charging level capabilities, trip information, and the like to determine a mutually beneficial charging schedule that may then be transmitted to the charging station 112. In this manner, the vehicles may use the existing communication infrastructure to cooperate, which both increases the ability of users to control the charging experience and reduces the drain on the processing power of the charging station 112 that would otherwise merely be acting as an intermediary between the host vehicle 102 and the proximate vehicle 108.

Figure 9:
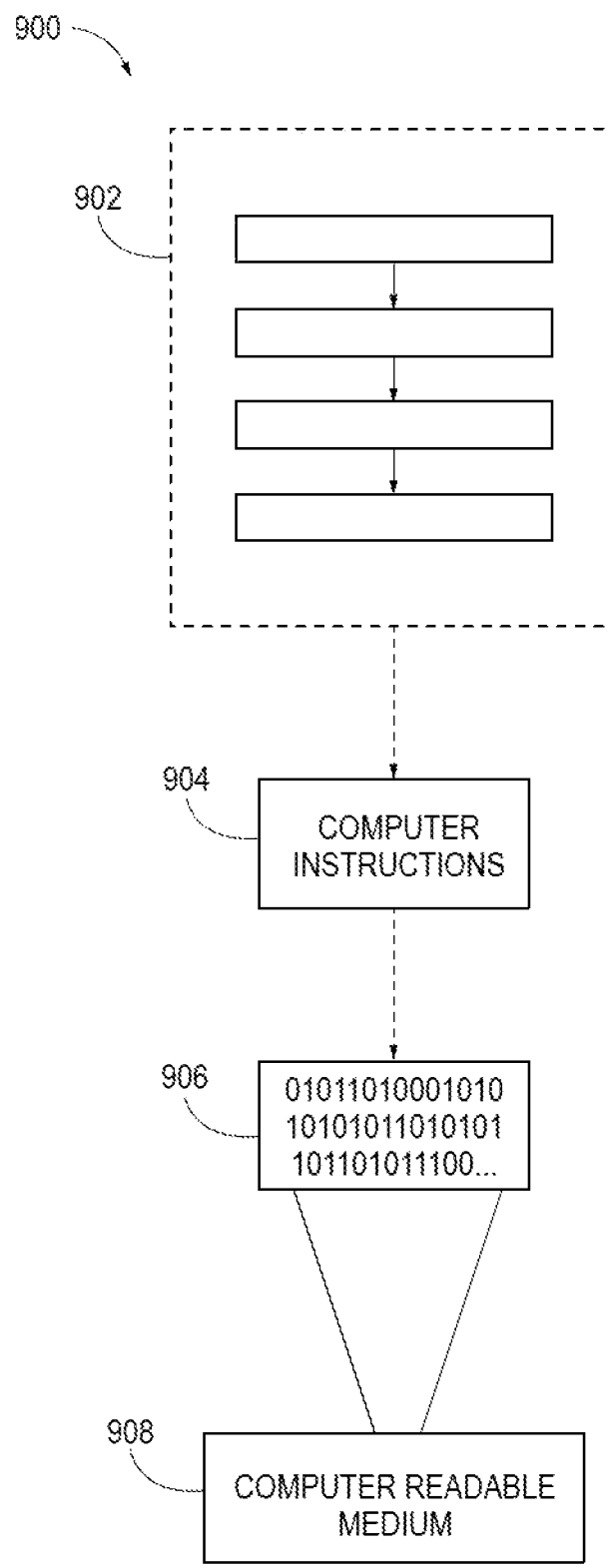
FIG. 9 is an illustration of an example computer-readable medium or computer-readable device including processor-executable instructions configured to embody one or more of the provisions set forth herein, according to one aspect.

Still another aspect of the systems and methods for a multi-vehicle charging station involves a computer-readable medium including processor-executable instructions configured to implement one aspect of the techniques presented herein. An aspect of a computer-readable medium or a computer-readable device devised in these ways is illustrated in FIG. 9, wherein an implementation 900 includes a computer-readable medium 908, such as a CD-R, DVD-R, flash drive, a platter of a hard disk drive, etc., on which is encoded computer-readable data 906. This encoded computer-readable data 906, such as binary data including a plurality of zero's and one's as shown in 906, in turn includes a set of processor-executable computer instructions 904 configured to operate according to one or more of the principles set forth herein. In this implementation, the processor-executable computer instructions 904 may be configured to perform a method 902, such as the method 600 of FIG. 6 and/or method 700 of FIG. 7. In another aspect, the processor-executable computer instructions 904 may be configured to implement a system, such as the operating environment of FIG. 2, FIG. 3, and/or FIG. 4. Many such computer-readable media may be devised by those of ordinary skill in the art that are configured to operate in accordance with the techniques presented herein.

The term "computer readable media" as used herein includes computer storage media. Computer storage media includes volatile and nonvolatile, removable and non-removable media implemented in any method or technology for storage of information such as computer readable instructions or other data. Memory 206 and data store 208 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

While described with respect to a host vehicle 102 and a proximate vehicle 108, it will be appreciated that the charging station may charge more than two vehicles. For example, the charge application 118 may be hosted by one or more of the host vehicle 102, the proximate vehicle 108, and/or additional proximate vehicles. Accordingly, the systems and methods described herein may extend to more than the host vehicle 102 and the proximate vehicle, but to multiple proximate veh It will be appreciated that several of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for user negotiation associated with a charging station, comprising:
sending a broadcast message with a cooperation proposal for a charging station configured to provide a host vehicle and a proximate vehicle a charge, wherein the cooperation proposal includes a cooperative charging schedule having charging parameters for charging the host vehicle and the proximate vehicle, the charging parameters having vehicle specific constraints including departure time from the charging station, historical data, preferred charging speed and vehicle charging capabilities;
determining whether the charging parameters of the cooperative charging schedule are amenable by receiving a response from the proximate vehicle including a proximate vehicle charging schedule having proximate vehicle historical data, comparing the cooperative charging schedule and the proximate vehicle charging schedule, and identifying differences between the cooperative charging schedule and the proximate vehicle charging schedule;
in response to determining that the charging parameters are not amenable, generating a counter parameter that proposes an adjustment to at least one charging parameter;
updating the cooperative charging schedule with the counter parameter;
determining whether an updated cooperative charging schedule with the counter parameter is amenable; and
transmitting the updated cooperative charging schedule to the charging station in response to determining the updated cooperative charging schedule is amenable.

2. The method of claim 1, wherein charging parameters of the cooperative charging schedule are based on a host vehicle charging schedule of the host vehicle.

3. The method of claim 1, wherein the counter parameter is based on the proximate vehicle charging schedule.

4. The method of claim 1, wherein the counter parameter is based on maintenance data or performance data from the charging station.

5. The method of claim 1, further comprising:
calculating a host vehicle charge period based on a host vehicle desired SOC and a proximate vehicle charge period based on the proximate vehicle desired SOC; and
determining whether the host vehicle is able to reach the host vehicle desired SOC or the proximate vehicle is able to reach the proximate vehicle desired SOC, wherein the counter parameter is based on the determination.

6. The method of claim 1, wherein the charging parameters include at least one of a host vehicle departure time, a host vehicle desired SOC, and host vehicle historical data.

7. The method of claim 1, wherein determining whether the charging parameters of the cooperative charging schedule are amenable includes receiving a response from a vehicle occupant of the proximate vehicle.

8. A system for user negotiation associated with a charging station, comprising:
a processor; and
a memory storing instructions when executed by the processor cause the processor to:
send a broadcast message with a cooperation proposal for a charging station configured to provide a host vehicle and a proximate vehicle a charge, wherein the cooperation proposal includes a cooperative charging schedule having charging parameters for charging the host vehicle and the proximate vehicle the char in, parameters having vehicle specific constraints including departure time from the charging station, historical data preferred charging speed and vehicle charging capabilities;
determine whether the charging parameters of the cooperative charging schedule are amenable by receiving a response from the proximate vehicle including a proximate vehicle charging schedule having proximate vehicle historical data, comparing the cooperative charging schedule and the proximate vehicle charging schedule, and identifying differences between the cooperative charging schedule and the proximate vehicle charging schedule;
in response to determining that the charging parameters are not amenable, generate a counter parameter that proposes an adjustment to at least one charging parameter;
update the cooperative charging schedule with the counter parameter;

determine whether an updated cooperative charging schedule with the counter parameter is amenable; and transmit the updated cooperative charging schedule to the charging station in response to determining the updated cooperative charging schedule is amenable.

9. The system of claim 8, wherein charging parameters of the cooperative charging schedule are based on a host vehicle charging schedule of the host vehicle.

10. The system of claim 8, wherein the counter parameter is based on the proximate vehicle charging schedule.

11. The system of claim 8, wherein the counter parameter is based on maintenance data or performance data from the charging station.

12. The system of claim 8, wherein the memory storing the instructions when executed by the processor further cause the processor to:
  calculate a host vehicle charge period based on a host vehicle desired SOC and a proximate vehicle charge period based on the proximate vehicle desired SOC; and
  determine whether the host vehicle is able to reach the host vehicle desired SOC or the proximate vehicle is able to reach the proximate vehicle desired SOC, wherein the counter parameter is based on the determination.

13. The system of claim 8, wherein the charging parameters include at least one of a host vehicle departure time, a host vehicle desired SOC, and host vehicle historical data.

14. The system of claim 8, wherein determining whether the charging parameters of the cooperative charging schedule are amenable includes receiving a response from a vehicle occupant of the proximate vehicle.

15. A non-transitory computer readable storage medium storing instruction that when executed by a computer, which includes a processor to perform a method for user negotiation associated with a charging station, the method comprising:

sending a broadcast message with a cooperation proposal for a charging station configured to provide a host vehicle and a proximate vehicle a charge, wherein the cooperation proposal includes a cooperative charging schedule having charging parameters for charging the host vehicle and the proximate vehicle, the charging parameters having vehicle specific constraints including departure time from the charging station, historical data, preferred charging speed and vehicle charging capabilities;

determining whether the charging parameters of the cooperative charging schedule are amenable by receiving a response from the proximate vehicle including a proximate vehicle charging schedule having proximate vehicle historical data, comparing the cooperative charging schedule and the proximate vehicle charging schedule, and identifying differences between the cooperative charging schedule and the proximate vehicle charging schedule;

in response to determining that the charging parameters are not amenable, generating a counter parameter that proposes an adjustment to at least one charging parameter;

updating the cooperative charging schedule with the counter parameter;

determining whether an updated cooperative charging schedule with the counter parameter is amenable; and transmitting the updated cooperative charging schedule to the charging station in response to determining the updated cooperative charging schedule is amenable.

16. The method of claim 15, wherein charging parameters of the cooperative charging schedule are based on a host vehicle charging schedule of the host vehicle.

17. The method of claim 15, wherein the counter parameter is based on the proximate vehicle charging schedule.

\* \* \* \* \*